(12) United States Patent
Chen

(10) Patent No.: US 11,880,690 B1
(45) Date of Patent: Jan. 23, 2024

(54) METHOD, SYSTEM AND APPARATUS FOR MONITORING BIOS BOOTING PROCESS OF SERVER

(71) Applicant: INSPUR SUZHOU INTELLIGENT TECHNOLOGY CO., LTD., Jiangsu (CN)

(72) Inventor: Zhanliang Chen, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/273,773

(22) PCT Filed: Nov. 29, 2021

(86) PCT No.: PCT/CN2021/134053
§ 371 (c)(1),
(2) Date: Jul. 23, 2023

(87) PCT Pub. No.: WO2023/024304
PCT Pub. Date: Mar. 2, 2023

(30) Foreign Application Priority Data

Aug. 25, 2021 (CN) .......................... 202110978208.0

(51) Int. Cl.
*G06F 9/4401* (2018.01)
(52) U.S. Cl.
CPC ................................ *G06F 9/4403* (2013.01)

(58) Field of Classification Search
CPC .................................................. G06F 9/4403
See application file for complete search history.

(56) References Cited

U.S. PATENT DOCUMENTS

| | | | |
|---|---|---|---|
| 2005/0195075 A1* | 9/2005 | McGraw | H05K 7/1494 714/E11.188 |
| 2009/0077365 A1* | 3/2009 | Masuyama | G06F 11/3476 713/2 |
| 2016/0328300 A1 | 11/2016 | Rahardjo et al. | |
| 2019/0236281 A1* | 8/2019 | Hershman | G06F 21/85 |
| 2020/0004994 A1* | 1/2020 | Hershman | G06F 21/85 |
| 2022/0107913 A1* | 4/2022 | Hartlage | G06F 13/4282 |

FOREIGN PATENT DOCUMENTS

| | | |
|---|---|---|
| CN | 104503783 A | 4/2015 |
| CN | 105786421 A | 7/2016 |
| CN | 106649023 A | 5/2017 |

(Continued)

*Primary Examiner* — Gary Collins
(74) *Attorney, Agent, or Firm* — IPro, PLLC

(57) ABSTRACT

A method, system and apparatus for monitoring a BIOS booting process of a server. The method includes: detecting whether a PCH in a server starts to transmit data to a BMC; when the PCH starts to transmit data to the BMC, acquiring data from an IO transmission line between the PCH and the BMC and parsing same, and determining whether the parsed data includes process data which represents a BIOS booting process of the server; and when the parsed data includes the process data, displaying the process data. It can be seen that a user may directly and quickly determine the current booting process of a BIOS by means of displayed information, such that quick trouble locating of a server during a BIOS booting process is facilitated.

20 Claims, 3 Drawing Sheets

(56) References Cited

FOREIGN PATENT DOCUMENTS

| | | |
|---|---|---|
| CN | 108920317 A | 11/2018 |
| CN | 111475356 A | 7/2020 |
| CN | 112306795 A | 2/2021 |
| CN | 112463226 A | 3/2021 |
| CN | 113111342 A | 7/2021 |
| CN | 113419926 A | 9/2021 |
| TW | 201527965 A | 7/2015 |

* cited by examiner

METHOD, SYSTEM AND APPARATUS FOR MONITORING BIOS BOOTING PROCESS OF SERVER

The present disclosure claims the priority of the Chinese patent application filed on Aug. 25, 2021 before the China National Intellectual Property Administration with the application number of 202110978208.0 and the title of "METHOD, SYSTEM AND APPARATUS FOR MONITORING BIOS BOOTING PROCESS OF SERVER", which is incorporated herein in its entirety by reference.

FIELD

The present application relates to the field of BIOS booting of a server, and in particular, to a method, system and apparatus for monitoring a BIOS booting process of a server.

BACKGROUND

During the booting process of the Basic Input Output System (BIOS) in the server, the Platform Controller Hub (PCH) and the Baseboard Management Controller (BMC) of the server may exchange information, such as a BIOS booting process (namely, a phase of BIOS running).

At present, when the server has a problem during the BIOS booting process, resulting in a system booting failure, the user needs to obtain the log information representing the BIOS booting process from the BMC log so as to determine the current booting process of the BIOS, thereby facilitating the positioning of the server's problem during the BIOS booting process. However, in this way, the user cannot quickly determine the current booting process of the BIOS, which is unfavorable for quick positioning of the server's problem during the BIOS booting process.

Therefore, how to provide a solution for solving the above-mentioned technical problem is a problem to be currently solved by a person skilled in the art.

SUMMARY

The object of the present application is directed to provide a method, system and apparatus for monitoring a BIOS booting process of a server. A user may directly and quickly determine the current booting process of a BIOS by means of displayed information, such that quick trouble locating of a server during a BIOS booting process is facilitated.

In order to solve the above-mentioned technical problem, the present application provides a method for monitoring a BIOS booting process of a server, which is applied to a processor, including:

detecting whether a PCH in a server starts to transmit data to a BMC;
  in response to the PCH starting to transmit data to the BMC, acquiring data from an IO transmission line between the PCH and the BMC and parsing same, and determining whether parsed data includes process data which represents a BIOS booting process of the server; and
  in response to the parsed data including the process data, displaying the process data.

In an embodiment of the present application, a connecting line between the PCH and the BMC includes a clock signal line, an eSPI_IO transmission line and a CS signal line;
  the detecting whether a PCH in a server starts to transmit data to a BMC includes:
    detecting a clock signal on the clock signal line and a CS signal on the CS signal line, and determining whether the clock signal is at a low level and whether the CS signal has a falling edge;
    in response to the determination result being that the clock signal is at the low level and the CS signal has the falling edge, determining that the PCH starts to transmit the data to the BMC; and
    in response to the determination result being that the clock signal is not at the low level and/or the CS signal does not have the falling edge, determining that the PCH does not start to transmit the data to the BMC.

In an embodiment of the present application, the data transmitted by the PCH to the BMC successively includes CMD information, HDR information and DATA information; the acquiring data from an IO transmission line between the PCH and the BMC and
  parsing same, and determining whether the parsed data includes process data which represents a BIOS booting process of the server includes:
  acquiring the CMD information from the eSPI_IO transmission line and parsing same, and determining whether the parsed CMD information corresponds to a write data mode;
  in response to the parsed CMD information corresponding to a write data mode,
  continuing to acquire the HDR information from the eSPI_IO transmission line and parsing same, and determining whether the parsed HDR information is an address of a BIOS booting process code;
  in response to the parsed HDR information being an address of a BIOS booting process code, continuing to acquire the DATA information from the eSPI_IO transmission line and parsing same to obtain process data representing the BIOS booting process of the server, so as to enter the step of displaying the process data.

In an embodiment of the present application, acquiring target information from the eSPI_IO transmission line includes:
  starting from acquiring the target information from the eSPI_IO transmission line, acquiring one bit of data from the eSPI_IO transmission line every time a falling edge of the clock signal is detected; when the total number of bits continuously acquired is equal to the total number of bits of the target information, combining the continuously acquired bits to obtain the target information;
  wherein the target information is any information contained in the data transmitted by the PCH to the BMC.

In an embodiment of the present application, the CMD information is 8 bit valid data, and when the CMD information is 0100_0100, the CMD information corresponds to the write data mode; the HDR information is 16 bit valid data, and the address of the BIOS booting process code is 0080 h; the DATA information is 8 bit valid data.

In an embodiment of the present application, the data transmitted by the PCH to the BMC further includes CRC information;
  after obtaining the process data representing the BIOS booting process of the server and before displaying the process data, the method for monitoring the BIOS booting process of the server further includes:
    continuing to acquire the CRC information from the eSPI_IO transmission line and parsing same, and verifying the process data according to the parsed CRC information;

in response to the verification passing, entering the step of displaying the process data; and in response to the verification not passing, not entering the step of displaying the process data.

In order to solve the above-mentioned technical problem, the present application also provides a system for monitoring a BIOS booting process of a server, including:

a detection module configured for detecting whether a PCH in a server starts to transmit data to a BMC; in response to the PCH starting to transmit the data to the BMC, executing a determination module;

a determination module configured for acquiring data from an IO transmission line between the PCH and the BMC and parsing same, and determining whether the parsed data includes process data which represents a BIOS booting process of the server; in response to the parsed data containing the process data, executing a display module; and a display module configured for displaying the process data.

In an embodiment of the present application, a connecting line between the PCH and the BMC includes a clock signal line, an eSPI_IO transmission line and a CS signal line; the detection module is further configured for:

detecting a clock signal on the clock signal line and a CS signal on the CS signal line, and determining whether the clock signal is at a low level and whether the CS signal has a falling edge;

in response to the determination result being that the clock signal is at a low level and the CS signal has a falling edge, determining that the PCH starts to transmit the data to the BMC, and executing the determination module; and in response to the determination result being that the clock signal is not at a low level and/or the CS signal does not have a falling edge, determining that the PCH does not start to transmit the data to the BMC, and not executing the determination module.

In order to solve the above-mentioned technical problem, the present application further provides an apparatus for monitoring a BIOS booting process of a server, including:

a memory configured for storing computer programs; and a processor configured for implementing steps of the method for monitoring the BIOS booting process of the server according to any of the above-mentioned embodiments when executing the computer programs.

In an embodiment of the present application, the processor is a CPLD.

The present application provides a method for monitoring a BIOS booting process of a server, which is applied to a processor. The method includes: detecting whether a PCH in a server starts to transmit data to a BMC; in response to the PCH starting to transmit data to the BMC, acquiring data from an IO transmission line between the PCH and the BMC and parsing same, and determining whether the parsed data includes process data which represents a BIOS booting process of the server; and in response to the parsed data including the process data, displaying the process data. It can be seen that a user may directly and quickly determine the current booting process of a BIOS by means of displayed information, such that quick trouble locating of a server during a BIOS booting process is facilitated.

The present application also provides a monitoring system and apparatus for monitoring a BIOS booting process of a server, with the same beneficial effects as the above-mentioned monitoring method.

BRIEF DESCRIPTION OF THE DRAWINGS

In order to more clearly illustrate the technical solutions in the embodiments of the present application, the drawings to be used in the description of the embodiments will be briefly introduced below. Obviously, the drawings in the description below are only some embodiments of the present application. It will be apparent to those skilled in the art to obtain other drawings according to these drawings without involving any inventive effort.

DETAILED DESCRIPTION

The core of the present application is directed to provide a method, system and apparatus for monitoring a BIOS booting process of a server. A user may directly and quickly determine the current booting process of a BIOS by means of displayed information, such that quick trouble locating of a server during a BIOS booting process is facilitated.

In order to make the objectives, technical solutions, and advantages of the embodiments of the present application clearer, the technical solutions in the embodiments of the present application will be described clearly and completely in conjunction with the accompanying drawings in the embodiments of the present application. Obviously, the described embodiments are part of the embodiments of the present application, rather than all of the embodiments. Based on the embodiments in the present application, all other embodiments obtained by a person skilled in the art without involving any inventive effort are within the scope of protection of the present application.

Figure 1:
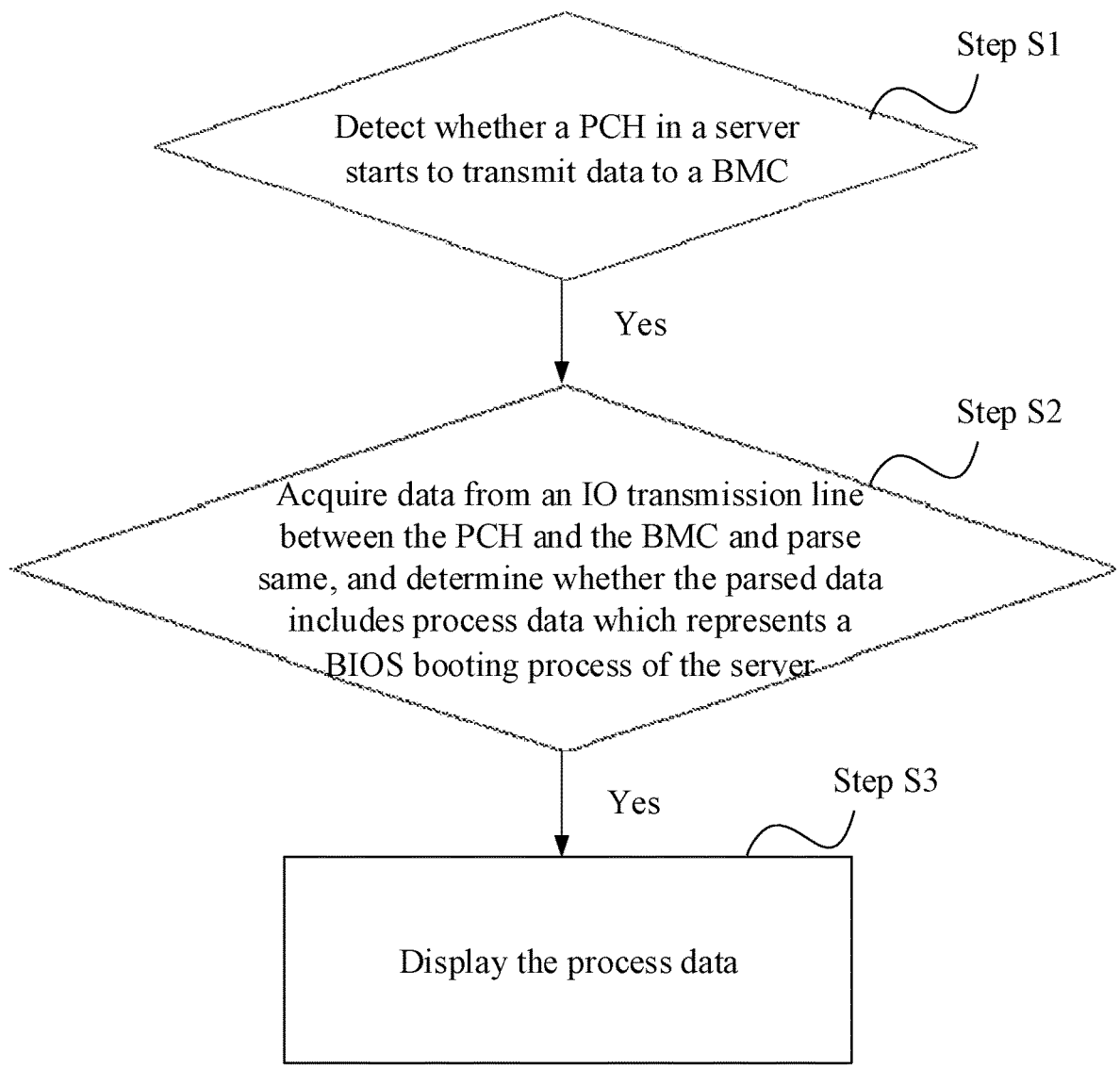
FIG. 1 is a flow chart of a method for monitoring a BIOS booting process of a server according to an embodiment of the present application.
Figure 2:
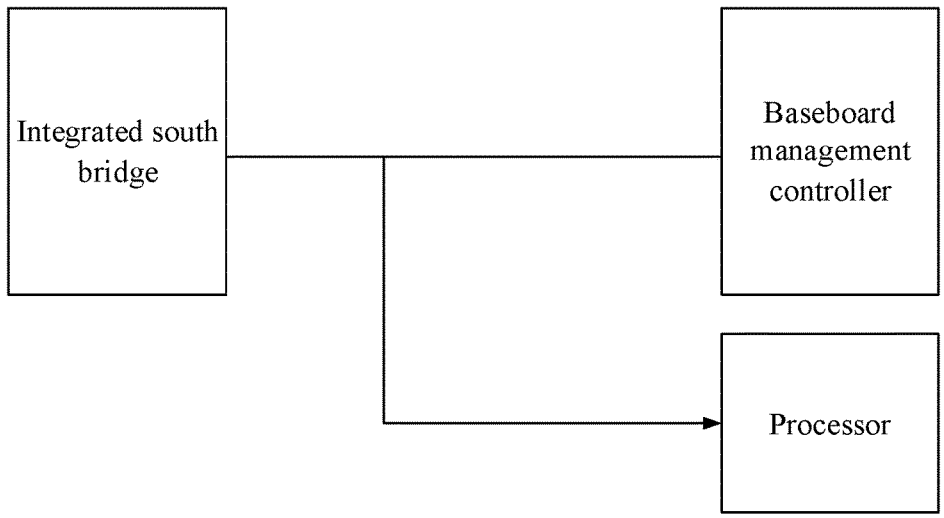
FIG. 2 is a structure diagram of an apparatus for monitoring a BIOS booting process of a server according to an embodiment of the present application.

With reference to FIGS. 1 and 2, FIG. 1 is a flow chart of a method for monitoring a BIOS booting process of a server according to an embodiment of the present application. FIG. 2 is a structure diagram of an apparatus for monitoring a BIOS booting process of a server according to an embodiment of the present application.

The method for monitoring a BIOS booting process of a server, which is applied to a processor, including:

Step S1, detecting whether a PCH in a server starts to transmit data to a BMC; in response to the PCH starting to transmit the data to the BMC, executing Step S2.

Step S2, acquiring data from an IO transmission line between the PCH and the BMC and parsing same, and determining whether the parsed data includes process data which represents a BIOS booting process of the server; in response to the parsed data including process data which represents a BIOS booting process of the server, executing Step S3.

Step S3, displaying the process data.

In some embodiments, considering that during the BIOS booting process in the server, the PCH of the server will transmit information such as a BIOS booting process to the BMC via an Input/Output (IO) transmission line connected to the BMC, and hence the present application detects whether the PCH in the server starts to transmit data to the BMC. When the PCH does not start to transmit data to the BMC, it continues to detect whether the PCH starts to transmit the data to the BMC. When the PCH starts to transmit the data to the BMC, the data is acquired from the IO transmission line between the PCH and the BMC, and the data acquired from the IO transmission line is parsed. Then it is determined whether the parsed data contains process data representing the BIOS booting process of the server. When the parsed data does not include process data which represents the BIOS booting process of the server, it does not process the data transmitted this time. When the parsed data includes process data representing the BIOS booting process of the server, the process data representing the BIOS booting process of the server is displayed. For example, the process data is displayed via a plurality of LED (light-emitting diode), so that a user may quickly determine the current booting process of the BIOS directly via the displayed information.

The present application provides a method for monitoring a BIOS booting process of a server, which is applied to a processor. The method includes: detecting whether a PCH in a server starts to transmit data to a BMC; when the PCH starts to transmit data to the BMC, acquiring data from an IO transmission line between the PCH and the BMC and parsing same, and determining whether the parsed data includes process data which represents a BIOS booting process of the server; and when the parsed data includes the process data, displaying the process data. It can be seen that a user may directly and quickly determine the current booting process of a BIOS by means of displayed information, such that quick trouble locating of a server during a BIOS booting process is facilitated.

Figure 3:
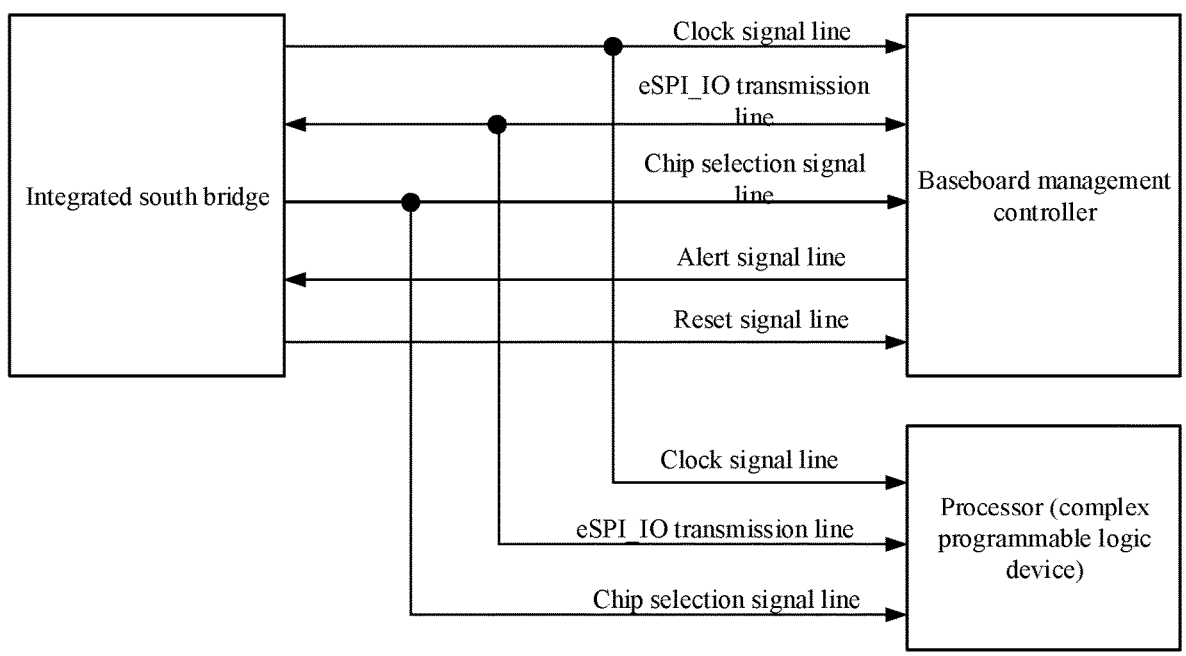
FIG. 3 is a detailed structure diagram of an apparatus for monitoring a BIOS booting process of a server according to an embodiment of the present application.

On the basis of the above-mentioned embodiments:

With reference to FIG. 3, FIG. 3 is a detailed structure diagram of an apparatus for monitoring a BIOS booting process of a server according to an embodiment of the present application.

In an embodiment of the present application, a connecting line between the PCH and the BMC includes a clock signal line, an eSPI_IO transmission line and a CS signal line;
  the detecting whether a PCH in a server starts to transmit data to a BMC includes:
  detecting a clock signal on the clock signal line and a CS signal on the CS signal line, and determining whether the clock signal is at a low level and whether the CS signal has a falling edge;
  when the determination result is that the clock signal is at the low level and the CS signal has the falling edge, determining that the PCH starts to transmit the data to the BMC; and
  when the determination result is that the clock signal is not at the low level and/or the CS signal does not have the falling edge, determining that the PCH does not start to transmit the data to the BMC.

In some embodiments, the PCH in the server of the present application supports an eSPI (Enhanced Serial Peripheral Interface) bus. The eSPI bus is a point-to-point communication mode for massive data communication between the PCH and the BMC. As a third-party device, the processor may analyze the data transmitted between the PCH and the BMC by means of monitoring.

As shown in FIG. 3, the connecting line between the PCH and the BMC in the server includes a clock signal line (CLK), an eSPI_IO transmission line and a CS (chip select) signal line, and may further include an alert signal line and a reset signal line. The processor only needs to use the clock signal line, the eSPI_IO transmission line and the CS signal line. The processor is respectively connected to the clock signal line, the eSPI_IO transmission line and the CS signal line so as to receive a CLK/CS/IO hardware signal from the PCH. Here, the processor receives data from the eSPI bus only as a monitoring device, and the originally bi-directional IO is a unidirectional input to the processor.

Considering that when the CLK signal is at a low level and the CS signal has a falling edge, the PCH starts to transmit the data to the BMC, and hence the present application detects the CLK signal on the clock signal line and the CS signal on the CS signal line, and determines whether the CLK signal is at a low level and whether the CS signal has a falling edge. When the CLK signal is at the low level and the CS signal has a falling edge, namely, the determination results are both yes, it is determined that the PCH starts to transmit the data to the BMC so as to acquire the data transmitted by the two from the eSPI_IO transmission line. On the other hand, when the CLK signal is not at the low level and/or the CS signal does not have the falling edge, i.e., not both of the determination results are yes, it is determined that the PCH does not start to transmit the data to the BMC.

In an embodiment, the data transmitted by the PCH to the BMC successively includes CMD information, HDR information and DATA information;

The acquiring data from an IO transmission line between the PCH and the BMC and parsing same and determining whether the parsed data includes process data which represents a BIOS booting process of the server includes:
  acquiring the CMD information from the eSPI_IO transmission line and parsing same, and determining whether the parsed CMD information corresponds to a write data mode;
  when the parsed CMD information corresponds to a write data mode, continuing to acquire the HDR information from the eSPI_IO transmission line and parsing same, and determining whether the parsed HDR information is an address of a BIOS booting process code; and
  when the parsed HDR information is an address of a BIOS booting process code, continuing to acquire the DATA information from the eSPI_IO transmission line and parsing same to obtain process data representing the BIOS booting process of the server, so as to enter the step of displaying the process data.

Figure 4:
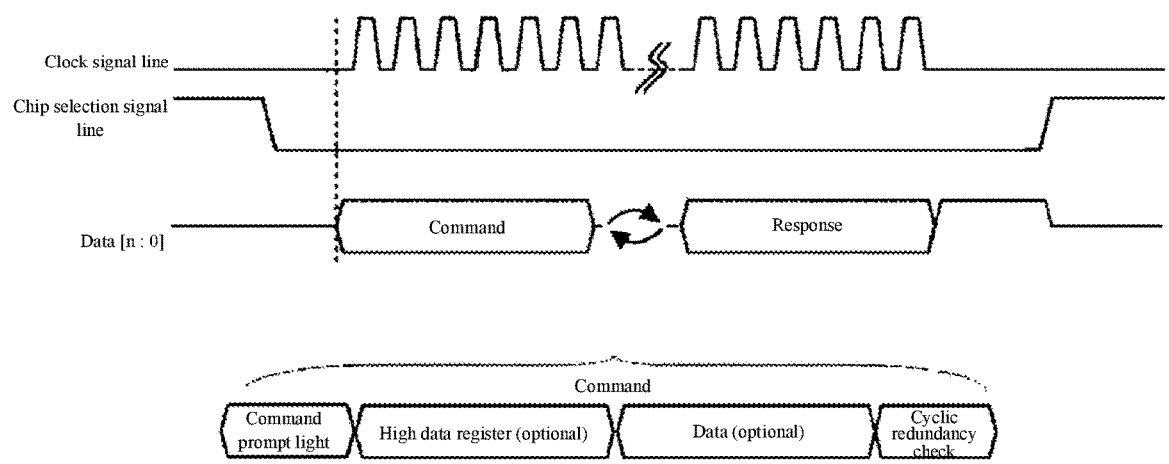
FIG. 4 is a schematic diagram of an eSPI protocol according to an embodiment of the present application.

In particular, with reference to FIG. 4, FIG. 4 is a schematic diagram of an eSPI protocol according to an embodiment of the present application. The host end achieves an operation of writing data by sending a COMMAND to the slave end. The slave end feeds back data through RESPONSE to achieve the operation of reading data.

During the data interaction between the PCH and the BMC, the PCH will send BIOS booting process codes to the BMC (the PCH is the host and the BMC is the slave), and the basic flow is as follows.

1) When the PCH sets the CMD (command prompt) information to be a PUT_IOWR_SHORT mode, the bus is configured to the write data mode in which the PCH writes data to the BMC.
2) The PCH sends a 16 bit (bit) address to the BMC via HDR (High Data Register) information so as to notify the BMC of the register address of the DATA (data) information to be sent. The address of the BIOS booting process code is 0080 h.

3) The PCH sends the BIOS booting process code (DATA information) to the BMC to indicate the current booting process of BIOS.

Based on this, when detecting that the PCH starts to transmit the data to the BMC, the present application acquires CMD information from the eSPI_IO transmission line therebetween and parses same, and then determines whether the parsed CMD information corresponds to a data writing mode. When the parsed CMD information does not correspond to the write data mode, it terminates the current data monitoring. When the parsed CMD information corresponds to the write data mode, it continues to acquire HDR information from the eSPI_IO transmission line and parses same, and then determines whether the parsed HDR information is an address of the BIOS booting process code. When the parsed HDR information is not the address of the BIOS booting process code, it terminates the current data monitoring. When the parsed HDR information is an address of the BIOS booting process code, it continues to acquire the DATA information from the eSPI_IO transmission line and parses same, the parsed DATA information is process data representing the BIOS booting process of the server, and then proceeds to a step of displaying the process data.

In an embodiment of the present application, the acquiring target information from the eSPI_IO transmission line includes:
  starting from the acquiring the target information from the eSPI_IO transmission line, acquiring one bit of data from the eSPI_IO transmission line every time a falling edge of the clock signal is detected; when the total number of bits continuously acquired is equal to the total number of bits of the target information, combining the continuously acquired bits to obtain the target information;
  wherein the target information is any information contained in the data transmitted by the PCH to the BMC.

In some embodiments, starting with the transmission of data to the BMC at PCH, the CMD information of 8 bit, the HDR information of 16 bit, and the DATA information of 8 bit are sequentially transmitted.

Based on this, in the present application, starting from the PCH transmitting data to the BMC, each time a falling edge of a clock signal is detected, one bit of data is acquired from the eSPI_IO transmission line therebetween. When the total number of bits acquired continuously this time is equal to 8 bit, the bits acquired continuously this time are combined to obtain CMD information. After the PCH transmits the CMD information to the BMC, each time a falling edge of a clock signal is detected, one bit of data is acquired from the eSPI_IO transmission line therebetween. When the total number of bits acquired continuously this time is equal to 16 bit, the bits acquired continuously this time are combined to obtain the HDR information. After the PCH transmits the HDR information to the BMC, each time a falling edge of a clock signal is detected, one bit of data is acquired from the eSPI_IO transmission line therebetween. When the total number of bits acquired continuously this time is equal to 8 bit, the bits acquired continuously this time are combined to obtain the DATA information.

In an embodiment of the present application, the CMD information is 8 bit valid data. When the CMD information is 0100_0100, the CMD information corresponds to the write data mode. The HDR information is 16 bit valid data, and the address of the BIOS booting process code is 0080 h. The DATA information is 8 bit valid data.

In some embodiments, the process of acquiring and parsing data from the eSPI_IO transmission line between PCH and BMC in the present application is as follows.
  1) The CLK signal and the CS signal are monitored in real time. When the CLK signal is at a low level and the CS signal has a falling edge, the PCH starts to transmit the data to the BMC.
  2) After detecting that the PCH starts to transmit the data to the BMC, it parses IO data when the falling edge of the CLK signal is detected, wherein the CMD information is valid data of 8 bit. When it parses that the CMD information is 0100_0100, it is determined that the parsed CMD information corresponds to the data writing mode, and it continued to execute the next step; otherwise, the data monitoring is terminated.
  3) The IO data continues to be monitored on the falling edge of the CLK signal, and at this moment, the PCH will send the HDR information of 16 bit. When parsing that the HDR information is 0080 h, it continues to execute the next step; otherwise, the data monitoring is terminated.
  4) The IO data continues to be monitored on the falling edge of the CLK signal, and at this time, the PCH will send the DATA information of 8 bit. Namely, the 8 bit data is the process data representing the BIOS booting process of the server.

In an embodiment of the present application, the data transmitted by the PCH to the BMC further includes CRC information;
  after obtaining the process data representing the BIOS booting process of the server and before displaying the process data, the method for monitoring the BIOS booting process of the server further includes:
  continuing to acquire the CRC information from the eSPI_IO transmission line and parsing same, and verifying the process data according to the parsed CRC information;
  when the verification passes, entering the step of displaying the process data; and
  when the verification does not pass, not entering the step of displaying the process data.

Further, as shown in FIG. 4, the data transmitted from the PCH of the present application to the BMC also includes Cyclic Redundancy Check (CRC) information. After obtaining the process data representing the BIOS booting process of the server, the present application continues to acquire the CRC information from the eSPI_IO transmission line and parse same, and then verifies the obtained process data according to the parsed CRC information. When the verification is passed, indicating that the process data acquired by the monitoring is valid, it enters into a step of displaying the process data. When the verification is not passed, indicating that the process data acquired by the monitoring is invalid, it does not enter into the step of displaying the process data, and the process data acquired by the monitoring is directly discarded.

In addition, after receiving the above-mentioned data sent by the PCH, the BMC will feed back the reception result to PCH after ensuring that the verification result is accurate, so as to notify PCH that this transmission data has been received. When the PCH does not receive the reception result fed back by the BMC within a preset time, it is considered that the BMC does not receive this transmission data, and data retransmission will be performed to ensure that BMC receives the transmitted data.

It should be noted that the steps of the above-mentioned embodiments are all implemented by a processor, and the processor may be a CPLD (Complex programmable logic device) in a server.

Figure 5:
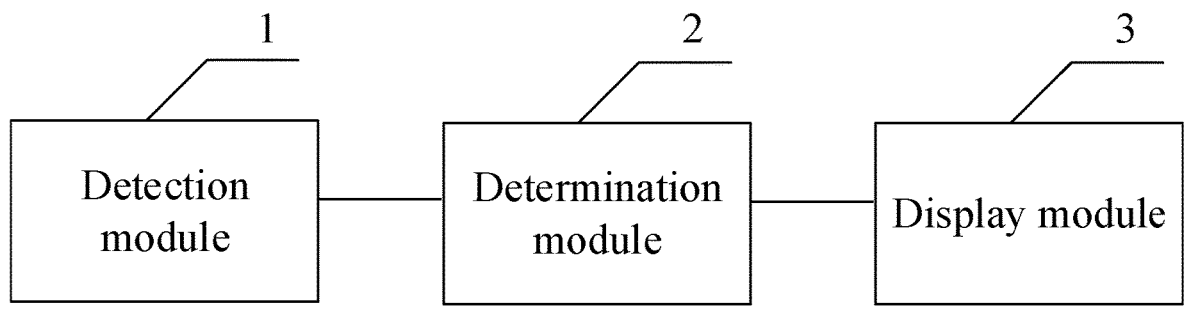
FIG. 5 is a structure diagram of a system for monitoring a BIOS booting process of a server according to an embodiment of the present application.

With reference to FIG. 5, FIG. 5 is a structure diagram of a system for monitoring a BIOS booting process of a server according to an embodiment of the present application.

The system for monitoring the BIOS booting process of the server includes:
- a detection module 1 configured for detecting whether a PCH in a server starts to transmit data to a BMC; under the condition that the PCH starts to transmit the data to the BMC, executing a determination module 2;
- a determination module 2 configured for acquiring data from an IO transmission line between the PCH and the BMC and parsing same, and determining whether the parsed data includes process data which represents a BIOS booting process of the server; when the parsed data includes process data which represents a BIOS booting process of the server, executing a display module 3; and
- a display module 3 configured for displaying the process data.

In an embodiment of the present application, a connecting line between the PCH and the BMC includes a clock signal line, an eSPI_IO transmission line and a CS signal line;
the detection module 1 is configured for:
detecting a clock signal on the clock signal line and a CS signal on the CS signal line, and determining whether the clock signal is at a low level and whether the CS signal has a falling edge;
when the determination result is that the clock signal is at the low level and the CS signal has the falling edge, namely, both are yes, it is determined that the PCH starts to transmit the data to the BMC, and a determination module is executed;
when the determination result is that the clock signal is not at the low level and/or the CS signal does not have the falling edge, namely, not both are yes, it is determined that the PCH does not start to transmit the data to the BMC, and the determination module is not executed.

Reference is made to the embodiments of the monitoring method described above for the description of the monitoring system provided in the present application, which will not be repeated here.

The present application further provides an apparatus for monitoring a BIOS booting process of a server, including:
- a memory configured for storing computer programs; and
- a processor configured for implementing steps of the method for monitoring the BIOS booting process of the server according to any of the above-mentioned embodiments when executing the computer programs.

In an embodiment of the present application, the processor is a CPLD.

The description of the monitoring apparatus provided in the present application refers to the embodiments of the monitoring method described above, and the description thereof will not be repeated here.

It should be noted that relational terms in the description such as first and second, and the like, may be used herein to distinguish one entity or action from another entity or action without necessarily requiring or implying any such actual relationship or order between such entities or actions. Furthermore, the terms "comprises", "comprising", or any other variation thereof, are intended to cover a non-exclusive inclusion, such that a process, method, article, or apparatus that includes a list of elements does not include only those elements but may include other elements not expressly listed or inherent to such process, method, article, or apparatus. An element proceeded by the phrase "comprising a" does not, without more constraints, preclude the existence of additional identical elements in the process, method, article, or apparatus that includes the element.

The previous description of the disclosed embodiments is provided to enable any person skilled in the art to make or use the present application. Various modifications to these embodiments will be readily apparent to those skilled in the art. The generic principles defined herein may be implemented in other embodiments without departing from the spirit or scope of the present application. Thus, the present application is not intended to be limited to the embodiments shown herein but accords with the widest scope consistent with the principles and novel features disclosed herein.

The invention claimed is:

1. A method for monitoring a Basic Input Output System (BIOS) booting process of a server, wherein the method is applied to a processor, comprising:
    detecting whether a Platform Controller Hub (PCH) in a server starts to transmit data to a Baseboard Management Controller (BMC);
    in response to the PCH starting to transmit data to the BMC, acquiring data from an Input/Output (IO) transmission line between the PCH and the BMC and parsing same, and determining whether parsed data includes process data which represents a BIOS booting process of the server; and
    in response to the parsed data including the process data, displaying the process data;
    wherein a connecting line between the PCH and the BMC comprises a clock signal line, an enhanced serial peripheral interface_input/output (eSPI_IO) transmission line and a chip select (CS) signal line;
    the detecting whether a Platform Controller Hub (PCH) in a server starts to transmit data to a Baseboard Management Controller (BMC) comprises:
    detecting a clock signal on the clock signal line and a CS signal on the CS signal line, and determining whether the clock signal is at a low level and whether the CS signal has a falling edge;
    in response to a determination result being that the clock signal is at the low level and the CS signal has the falling edge, determining that the PCH starts to transmit the data to the BMC; and
    in response to the determination result being that the clock signal is not at the low level and/or the CS signal does not have the falling edge, determining that the PCH does not start to transmit the data to the BMC;
    wherein the data transmitted by the PCH to the BMC successively comprises command prompt (CMD) information, High Data Register (HDR) information and DATA information;
    the acquiring data from an IO transmission line between the PCH and the BMC and parsing same, and determining whether the parsed data includes process data which represents a BIOS booting process of the server comprises:
    acquiring the CMD information from the eSPI_IO transmission line and parsing same, and determining whether the parsed CMD information corresponds to a write data mode;
    in response to the parsed CMD information corresponding to a write data mode, continuing to acquire the HDR information from the eSPI_IO transmission line and parsing same, and determining whether the parsed HDR information is an address of a BIOS booting process code;

in response to the parsed HDR information being an address of a BIOS booting process code, continuing to acquire the DATA information from the eSPI_IO transmission line and parsing same to obtain process data representing the BIOS booting process of the server, so as to enter the step of displaying the process data.

2. The method for monitoring the BIOS booting process of the server according to claim 1, wherein acquiring target information from the eSPI_IO transmission line comprises:

starting from acquiring the target information from the eSPI_IO transmission line, acquiring one bit of data from the eSPI_IO transmission line every time a falling edge of the clock signal is detected; when the total number of bits continuously acquired is equal to the total number of bits of the target information, combining the continuously acquired bits to obtain the target information;

wherein the target information is any information contained in the data transmitted by the PCH to the BMC.

3. The method for monitoring the BIOS booting process of the server according to claim 2, wherein the CMD information is 8 bit valid data, and when the CMD information is 0100_0100, the CMD information corresponds to the write data mode; the HDR information is 16 bit valid data, and the address of the BIOS booting process code is 0080 h; the DATA information is 8 bit valid data.

4. The method for monitoring the BIOS booting process of the server according to claim 1, wherein the data transmitted by the PCH to the BMC further comprises CRC information;

after obtaining the process data representing the BIOS booting process of the server and before displaying the process data, the method for monitoring the BIOS booting process of the server further comprises:

continuing to acquire the CRC information from the eSPI_IO transmission line and parsing same, and verifying the process data according to the parsed CRC information;

in response to the verification passing, entering the step of displaying the process data; and in response to the verification not passing, not entering the step of displaying the process data.

5. The method for monitoring the BIOS booting process of the server according to claim 4, wherein the method further comprises:

receiving, by the BMC, the data sent by the PCH;
ensuring that a verification result is accurate;
feeding back, by the BMC, a reception result to the PCH; and when the PCH does not receive the reception result fed back by the BMC within a preset time, considering that the BMC does not receive the transmitted data this time, and performing data retransmission to ensure that the BMC receives the transmitted data.

6. The method for monitoring the BIOS booting process of the server according to claim 1, wherein the method further comprises:

when the PCH does not start to transmit the data to the BMC, continuing to detect whether the PCH starts to transmit the data to the BMC.

7. The method for monitoring the BIOS booting process of the server according to claim 1, wherein the method further comprises:

when the parsed data does not include the process data which represents the BIOS booting process of the server, not processing the data transmitted this time.

8. The method for monitoring the BIOS booting process of the server according to claim 1, wherein the step of displaying the process data comprises:

displaying the process data via a plurality of light-emitting diode.

9. The method for monitoring the BIOS booting process of the server according to claim 1, wherein the PCH in the server supports an Enhanced Serial Peripheral Interface (eSPI) bus, and the eSPI bus is a point-to-point communication mode for massive data communication between the PCH and the BMC.

10. The method for monitoring the BIOS booting process of the server according to claim 1, wherein the connecting line between the PCH and the BMC in the server further comprises an alert signal line and a reset signal line.

11. An apparatus for monitoring a BIOS booting process of a server, comprising:

a memory configured for storing computer programs; and
a processor configured for, when executing the computer programs, implementing operations comprising:

detecting whether a Platform Controller Hub (PCH) in a server starts to transmit data to a Baseboard Management Controller (BMC);

in response to the PCH starting to transmit data to the BMC, acquiring data from an Input/Output (IO) transmission line between the PCH and the BMC and parsing same, and determining whether parsed data includes process data which represents a BIOS booting process of the server; and in response to the parsed data including the process data, displaying the process data;

wherein a connecting line between the PCH and the BMC comprises a clock signal line, an eSPI_IO transmission line and a chip select (CS) signal line;

the operation of detecting whether a Platform Controller Hub (PCH) in a server starts to transmit data to a Baseboard Management Controller (BMC) comprises:

detecting a clock signal on the clock signal line and a CS signal on the CS signal line, and determining whether the clock signal is at a low level and whether the CS signal has a falling edge;

in response to a determination result being that the clock signal is at the low level and the CS signal has the falling edge, determining that the PCH starts to transmit the data to the BMC; and in response to the determination result being that the clock signal is not at the low level and/or the CS signal does not have the falling edge, determining that the PCH does not start to transmit the data to the BMC;

wherein the data transmitted by the PCH to the BMC successively comprises command prompt (CMD) information, High Data Register (HDR) information and DATA information;

the operation of acquiring data from an IO transmission line between the PCH and the BMC and parsing same, and determining whether the parsed data includes process data which represents a BIOS booting process of the server comprises:

acquiring the CMD information from the eSPI_IO transmission line and parsing same, and determining whether the parsed CMD information corresponds to a write data mode;

in response to the parsed CMD information corresponding to a write data mode, continuing to acquire the HDR information from the eSPI_IO transmission line and parsing same, and determining whether the parsed HDR information is an address of a BIOS booting process code;

in response to the parsed HDR information being an address of a BIOS booting process code, continuing to acquire the DATA information from the eSPI_IO transmission line and parsing same to obtain process data representing the BIOS booting process of the server, so as to enter the step of displaying the process data.

12. The apparatus for monitoring the BIOS booting process of the server according to claim 11, wherein the processor is a CPLD.

13. The apparatus for monitoring a BIOS booting process of a server according to claim 11, wherein the operation of acquiring target information from the eSPI_IO transmission line comprises:

starting from acquiring the target information from the eSPI_IO transmission line, acquiring one bit of data from the eSPI_IO transmission line every time a falling edge of the clock signal is detected; when the total number of bits continuously acquired is equal to the total number of bits of the target information, combining the continuously acquired bits to obtain the target information;

wherein the target information is any information contained in the data transmitted by the PCH to the BMC.

14. The apparatus for monitoring the BIOS booting process of the server according to claim 13, wherein the CMD information is 8 bit valid data, and when the CMD information is 0100_0100, the CMD information corresponds to the write data mode; the HDR information is 16 bit valid data, and the address of the BIOS booting process code is 0080 h; the DATA information is 8 bit valid data.

15. The apparatus for monitoring the BIOS booting process of the server according to claim 11, wherein the data transmitted by the PCH to the BMC further comprises CRC information;

after obtaining the process data representing the BIOS booting process of the server and before displaying the process data, the operations further comprise:

continuing to acquire the CRC information from the eSPI_IO transmission line and parsing same, and verifying the process data according to the parsed CRC information;

in response to the verification passing, entering the step of displaying the process data; and in response to the verification not passing, not entering the step of displaying the process data.

16. The apparatus for monitoring the BIOS booting process of the server according to claim 11, wherein the operations further comprise:

when the PCH does not start to transmit the data to the BMC, continuing to detect whether the PCH starts to transmit the data to the BMC.

17. The apparatus for monitoring the BIOS booting process of the server according to claim 11, wherein the operations further comprise:

when the parsed data does not include the process data which represents the BIOS booting process of the server, not processing the data transmitted this time.

18. The apparatus for monitoring the BIOS booting process of the server according to claim 11, wherein the operation of displaying the process data comprises:

displaying the process data via a plurality of light-emitting diode.

19. The apparatus for monitoring the BIOS booting process of the server according to claim 11, wherein the PCH in the server supports an Enhanced Serial Peripheral Interface (eSPI) bus, and the eSPI bus is a point-to-point communication mode for massive data communication between the PCH and the BMC.

20. The apparatus for monitoring the BIOS booting process of the server according to claim 11, wherein the connecting line between the PCH and the BMC in the server further comprises an alert signal line and a reset signal line.

* * * * *